(12) United States Patent
Hoke et al.

(10) Patent No.: US 10,309,314 B2
(45) Date of Patent: Jun. 4, 2019

(54) FINNED IGNITOR GROMMET FOR A GAS TURBINE ENGINE

(71) Applicant: United Technologies Corporation, Hartford, CT (US)

(72) Inventors: James B. Hoke, Tolland, CT (US); James P. Bangerter, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 108 days.

(21) Appl. No.: 14/770,341

(22) PCT Filed: Feb. 25, 2014

(86) PCT No.: PCT/US2014/018143
§ 371 (c)(1),
(2) Date: Aug. 25, 2015

(87) PCT Pub. No.: WO2014/130978
PCT Pub. Date: Aug. 28, 2014

(65) Prior Publication Data
US 2016/0010559 A1 Jan. 14, 2016

Related U.S. Application Data

(60) Provisional application No. 61/768,950, filed on Feb. 25, 2013.

(51) Int. Cl.
*F02C 7/25* (2006.01)
*F23R 3/00* (2006.01)

(52) U.S. Cl.
CPC ............. *F02C 7/25* (2013.01); *F23R 3/002* (2013.01); *F05D 2220/32* (2013.01); *F05D 2240/35* (2013.01); *F05D 2260/231* (2013.01); *F23R 2900/00004* (2013.01); *F23R 2900/00012* (2013.01); *F23R 2900/03042* (2013.01); *F23R 2900/03044* (2013.01); *F23R 2900/03045* (2013.01); *Y02T 50/675* (2013.01)

(58) Field of Classification Search
CPC .... F23R 3/06; F23R 3/002; F23R 3/04; F23R 2900/03045; F23R 2900/03042; F23R 2900/03044; F23M 5/08; F05D 2240/35
See application file for complete search history.

(56) References Cited

U.S. PATENT DOCUMENTS

| | | | |
|---|---|---|---|
| 5,419,115 A | 5/1995 | Butler et al. | |
| 5,918,467 A | 7/1999 | Kwan | |
| 6,145,319 A | 11/2000 | Burns et al. | |
| 6,842,980 B2 | 1/2005 | Young et al. | |
| 7,748,221 B2 * | 7/2010 | Patel | F23R 3/10 60/752 |
| 8,919,127 B2 | 12/2014 | Melton et al. | |

(Continued)

OTHER PUBLICATIONS

EP search report for EP14753581.9 dated Oct. 7, 2016.
EP office action for EP14753581.9 dated Nov. 15, 2018.

*Primary Examiner* — Steven M Sutherland
*Assistant Examiner* — Thuyhang N Nguyen
(74) *Attorney, Agent, or Firm* — O'Shea Getz P.C.

(57) ABSTRACT

A heat shield for a combustor of a gas turbine engine includes a cold side opposite a hot side, the cold side defines a grommet that surrounds an igniter aperture, the grommet includes a multiple of fins.

17 Claims, 7 Drawing Sheets

(56) References Cited

U.S. PATENT DOCUMENTS

| | | |
|---|---|---|
| 9,091,445 B2 * | 7/2015 | Bunel .................... F02C 7/266 |
| 9,625,151 B2 | 4/2017 | Jause et al. |
| 2003/0213250 A1 | 11/2003 | Pacheco-Tougas et al. |
| 2004/0104538 A1 | 6/2004 | Pidcock et al. |
| 2010/0212324 A1 * | 8/2010 | Bronson ................ F02C 7/264 |
| | | 60/752 |

* cited by examiner

FINNED IGNITOR GROMMET FOR A GAS TURBINE ENGINE

This application claims priority to PCT Patent Appln. No. PCT/US14/18143 filed Feb. 25, 2014, which claims priority to U.S. Patent Appln. No. 61/768,950 filed Feb. 25, 2013.

BACKGROUND

The present disclosure relates to a gas turbine engine and, more particularly, to a cooling arrangement therefor.

Gas turbine engines, such as those that power modern commercial and military aircraft, generally include a compressor section to pressurize an airflow, a combustor section for burning a hydrocarbon fuel in the presence of the pressurized air, and a turbine section to extract energy from the resultant combustion gases.

The combustor section is subject to high thermal loads for prolonged time periods and various cooling arrangements are provided. Among these are impingement cooling on a backside and film cooling on a gas side to maintain temperatures within material limits.

SUMMARY

A heat shield for a combustor of a gas turbine engine according to one disclosed non-limiting embodiment of the present disclosure includes a cold side opposite a hot side, the cold side defines a grommet that surrounds an igniter aperture, the grommet includes a multiple of fins.

A further embodiment of the present disclosure includes, wherein the grommet includes a rail and a multiple of fins.

A further embodiment of any of the foregoing embodiments of the present disclosure includes, wherein the rail extends only partially around a circumference of the igniter aperture.

A further embodiment of any of the foregoing embodiments of the present disclosure includes, wherein the multiple of fins multiple of fins that extend only partially around a circumference of the igniter aperture.

A further embodiment of any of the foregoing embodiments of the present disclosure includes, wherein the rail extends only partially around a circumference of the igniter aperture and the multiple of fins extend only for the remainder of the circumference of the igniter aperture.

A further embodiment of any of the foregoing embodiments of the present disclosure includes, wherein the rail extends approximately 240 degrees around the igniter aperture and the multiple of fins extend approximately 120 degrees around the igniter aperture.

A further embodiment of any of the foregoing embodiments of the present disclosure includes, wherein the multiple of fins are pegs.

A combustor of a gas turbine engine according to another disclosed non-limiting embodiment of the present disclosure includes a heat shield with a grommet that surrounds an igniter aperture, the grommet includes a rail and a multiple of fins.

A further embodiment of any of the foregoing embodiments of the present disclosure includes, wherein the rail extends only partially around a circumference of the igniter aperture.

A further embodiment of any of the foregoing embodiments of the present disclosure includes, wherein the multiple of fins extend only partially around a circumference of the igniter aperture.

A further embodiment of any of the foregoing embodiments of the present disclosure includes, wherein the rail extends only partially around a circumference of the igniter aperture and the multiple of fins extend only for the remainder of the circumference of the igniter aperture.

A further embodiment of any of the foregoing embodiments of the present disclosure includes, wherein the rail extends approximately 240 degrees around the igniter aperture and the multiple of fins extend approximately 120 degrees around the igniter aperture.

A further embodiment of any of the foregoing embodiments of the present disclosure includes, wherein the multiple of fins are pegs.

A further embodiment of any of the foregoing embodiments of the present disclosure includes, further comprising an igniter that extends at least partially through the igniter aperture.

A further embodiment of any of the foregoing embodiments of the present disclosure includes, further comprising a support shell mounted to the heat shield.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
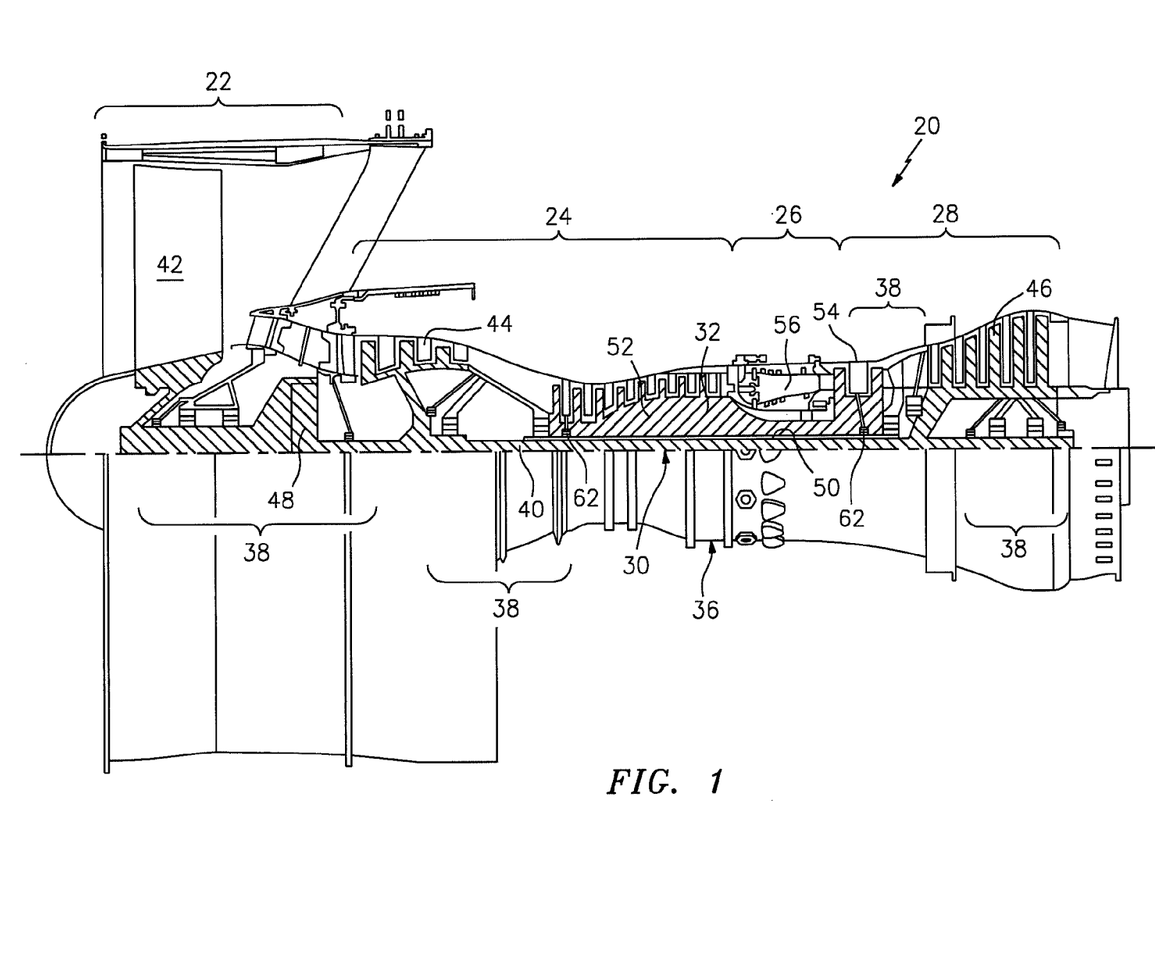
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
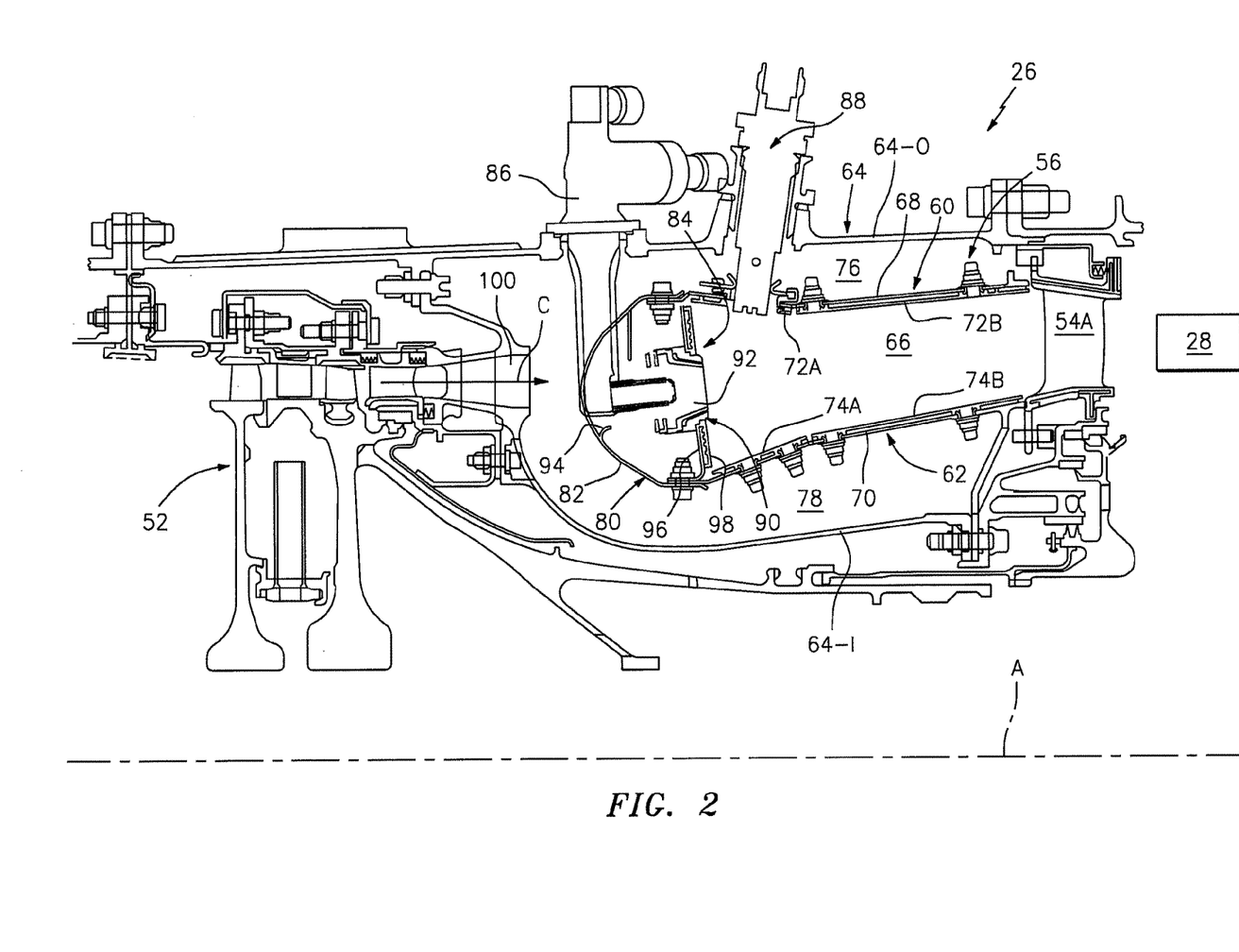
FIG. 2 is an expanded longitudinal schematic sectional view of a combustor section according to one non-limiting embodiment that may be used with the gas turbine engine shown in FIG. 1.

With reference to FIG. 2, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 is generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

Figure 3:
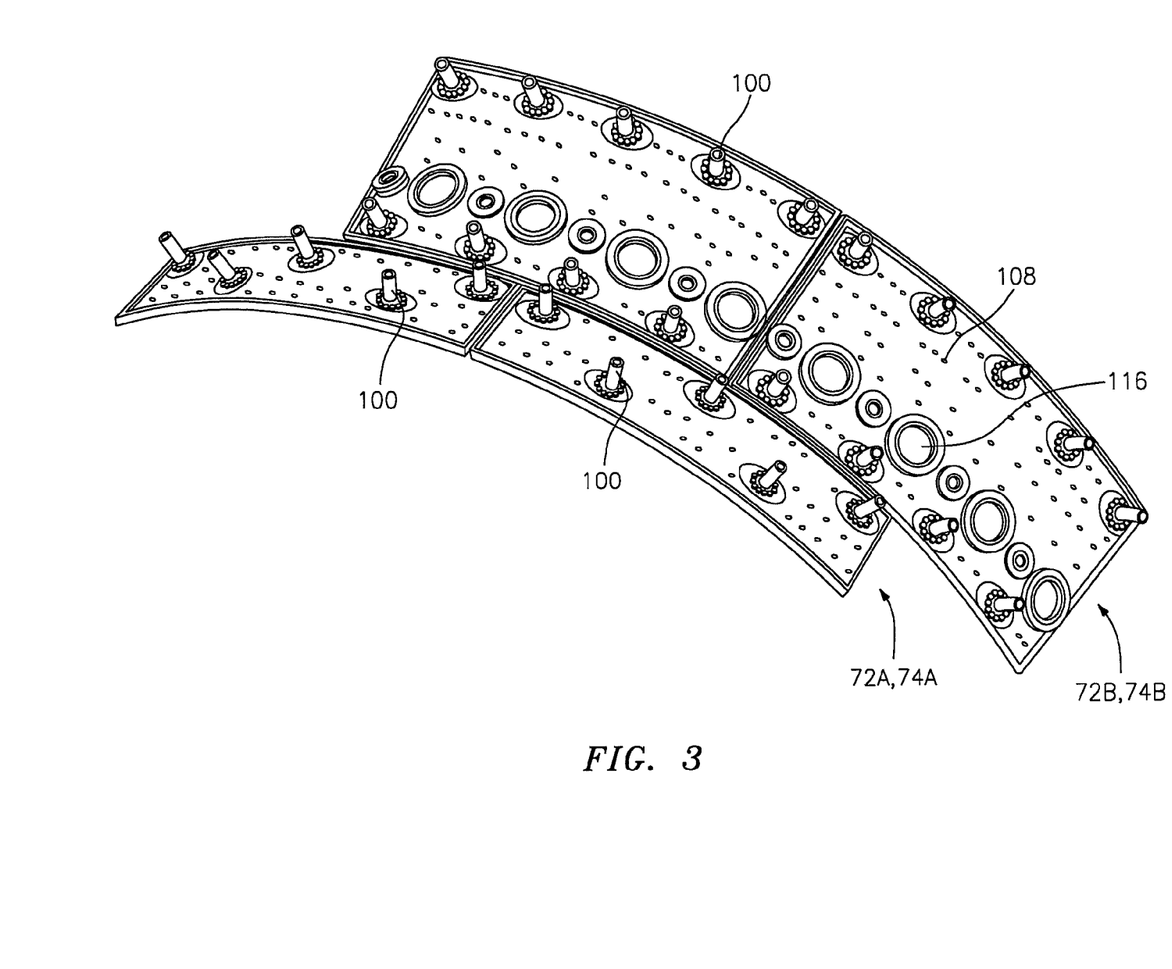
FIG. 3 is an expanded perspective view of a heat shield army from a cold side.

The combustor liner assemblies 60, 62 contain the combustion products for direction toward the turbine section 28. Each combustor liner assembly 60, 62 generally includes a respective support shell 68, 70 which supports one or more heat shields 72, 74 mounted to a hot side of the respective support shell 68, 70. Each of the heat shields 72, 74 may be generally rectilinear and manufactured of, for example, a nickel based super alloy, ceramic or other temperature resistant material and are arranged to form a liner array. In one disclosed non-limiting embodiment, the liner array includes a multiple of forward heat shields 72A and a multiple of aft heat shields 72B that are circumferentially staggered to line the hot side of the outer support shell 68 (also shown in FIG. 3). A multiple of forward heat shields 74A and a multiple of aft heat shields 74B are circumferentially staggered to line the hot side of the inner support shell 70 (also shown in FIG. 3).

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead heat shields 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Spark energy is provided to the combustor 56 through a frequency-pulsed igniter 88 (only one shown; illustrated schematically) that extends through at least one of the multiple of radially outward forward heat shields 72A. The igniter 88 such as a frequency-pulsed igniter provides a continuous spark or other ignition source. The igniter 88 may be located in a multiple of circumferential locations around the combustor 56 an in one or more outward forward heat shields 72A.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
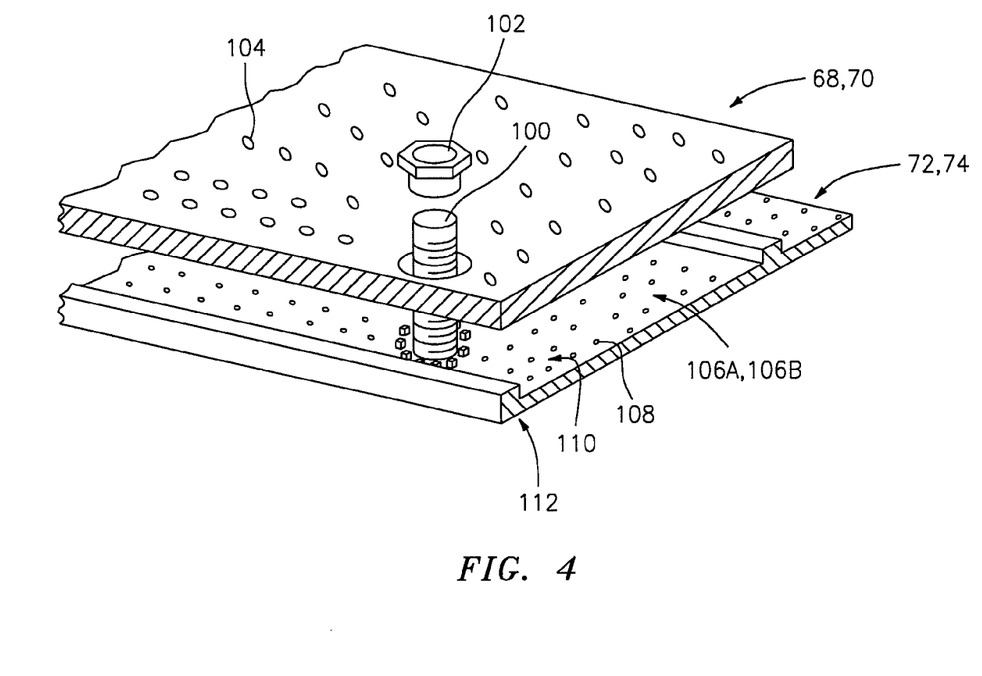
FIG. 4 is an exploded view of a liner assembly of the combustor.
Figure 5:
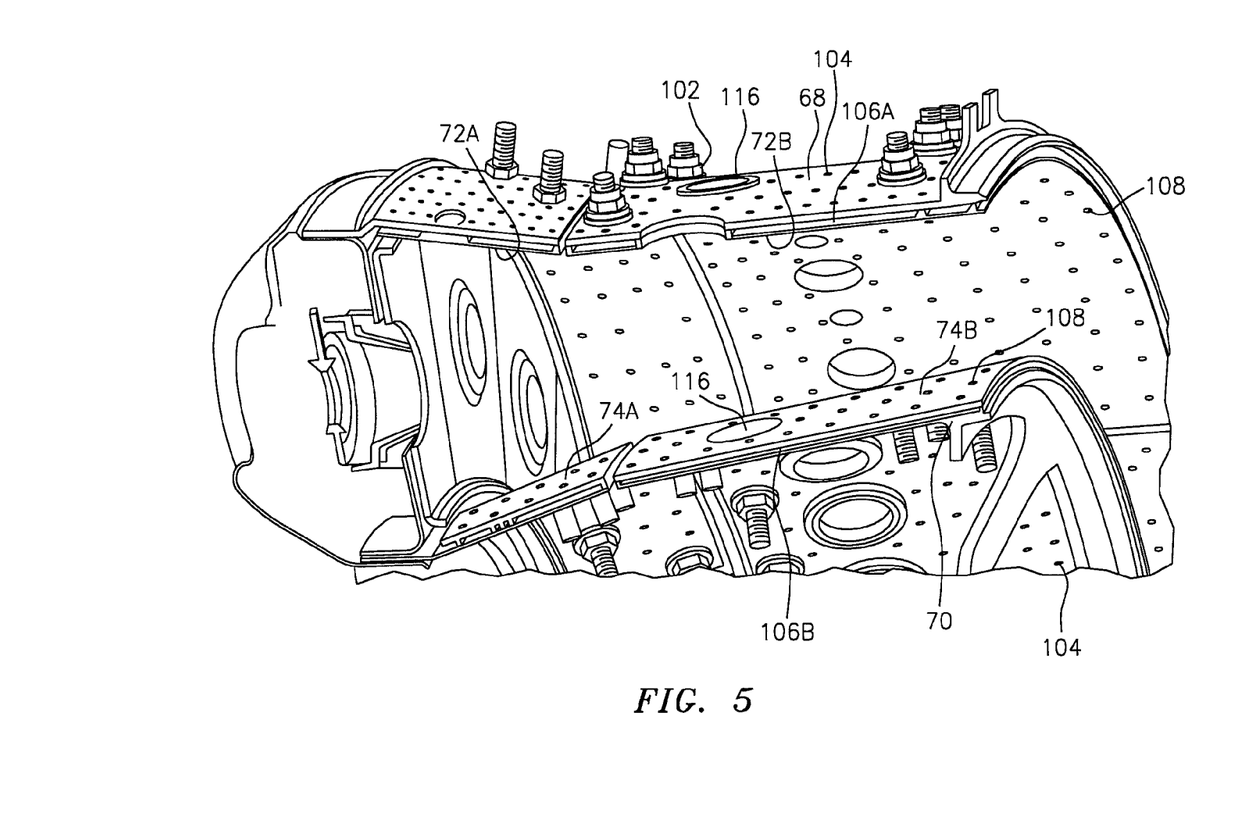
FIG. 5 is an expanded schematic partial perspective view of a combustor section.

With reference to FIG. 4, a multiple of studs 100 extend from the heat shields 72, 74. The multiple of studs 100 mount the heat shields 72, 74 to the respective support shells 68, 70 with fasteners 102 such as nuts (also shown in FIG. 5). That is, the studs 100 project rigidly from the heat shields 72, 74 and through the respective support shells 68, 70 to receive the fasteners 102 at a threaded distal end section thereof.

A multiple of cooling impingement holes 104 penetrate through the support shells 68, 70 to allow air from the respective annular plenums 76, 78 to enter cavities 106A, 106B (also shown in FIG. 5) formed in the combustor liner assemblies 60, 62 between the respective support shells 68, 70 and heat shields 72, 74. The cooling impingement holes 104 are generally normal to the surface of the heat shields 72, 74. The air in the cavities 106A, 106B provides backside impingement cooling of the heat shields 72, 74 that is generally defined herein as heat removal via internal convection.

A multiple of cooling film holes 108 penetrate through each of the heat shields 72, 74. The geometry of the film holes, e.g, diameter, shape, density, surface angle, incidence angle, etc., as well as the location of the holes with respect to the high temperature main flow also contributes to effusion film cooling. The combination of cooling impingement holes 104 and cooling film holes 108 within the respective support shells 68, 70 and heat shields 72, 74 may often be referred to as an Impingement Film Floatliner assembly.

The cooling film holes 108 allow the air to pass from the cavities 106A, 106B defined in part by a cold side 110 of the heat shields 72, 74 to a hot side 112 of the heat shields 72, 74 and thereby facilitate the formation of a film of cooling air along the hot side 112. The cooling film holes 108 are generally more numerous than the cooling impingement holes 104 to promote the development of a film cooling along the hot side 112 to sheath the heat shields 72, 74 on a combustion gas side. Film cooling as defined herein is the introduction of a relatively cooler airflow at one or more discrete locations along a surface exposed to a high temperature environment to protect that surface in the immediate region of the airflow injection as well as downstream thereof.

Figure 6:
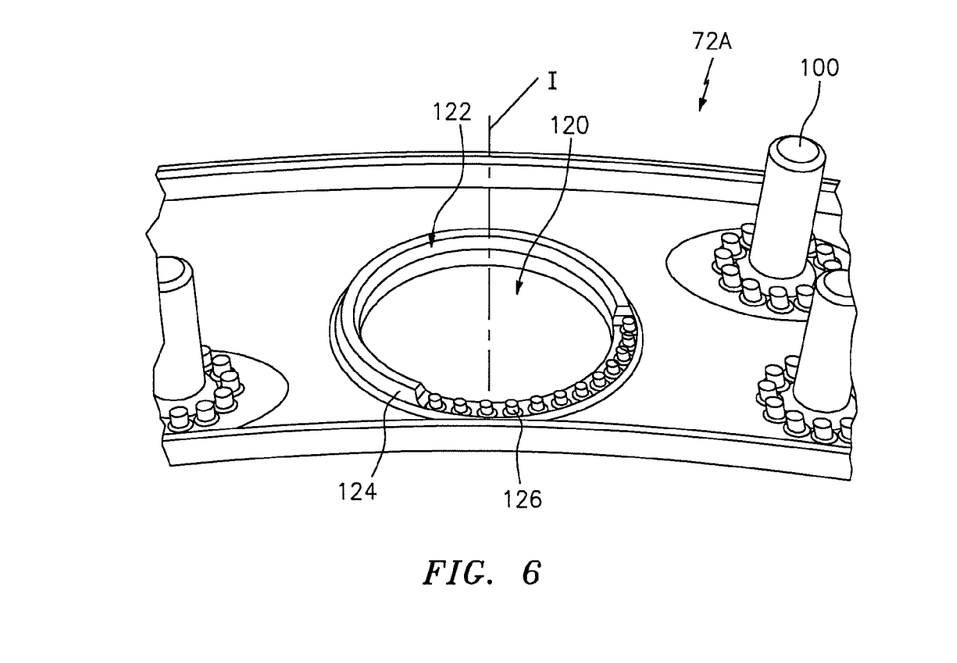
FIG. 6 is an expanded partial perspective view of an igniter aperture.

A multiple of dilution apertures 116 penetrate through both the respective support shells 68, 70 and heat shields 72, 74 along a common axis D (FIG. 6). For example only, in a Rich-Quench-Lean (R-Q-L) type combustor, the dilution apertures 116 (best seen in FIG. 3) are located downstream of the forward assembly 80 to quench the combustion gases to supply cooling air into the combustor 56. It should be understood that other combustor types will also benefit herefrom.

With reference to FIG. 6, the igniter 88 (FIG. 2) is located though an igniter aperture 120 along an igniter axis I in the forward heat shield 72A. The igniter aperture 120 is surrounded by a grommet 122 that extends from the cold side 110. The grommet 122 contacts the respective support shell 68 to provide a seal therewith to at least partially define the cavity 106A.

The combustion gases may slow towards the dilution apertures 116 and the igniter aperture 120 and may form stagnation points at the leading edges thereof. The stagnation points may form a heat source that may challenge the durability of the heat shields 72, 74 proximate this location. At the downstream edge of the dilution apertures 116 and the igniter aperture 120, the hot combustion gases may also form a standing vortex that may also challenge the durability of the heat shields 72, 74 proximate this location.

The grommet 122 includes a rail 124 that extends at least partially circumferentially around the igniter aperture 120 and a multiple of fins 126 that extend circumferentially for the remainder of the circumference. In one disclosed non-limiting embodiment, the rail 124 extends for approximately 240 degrees and the multiple of fins 126 extend for approximately 120 degrees.

The multiple of fins 126 may be pins, pegs, protrusions, tabs, rectilinear blocks, or of other shapes. That is, the multiple of fins 126 may include various non-circumferentially continues rail geometries.

The multiple of fins 126 facilitate airflow entry into the cavity 106A, 106B adjacent to the igniter 88 to purge the cavity of hot flow ingested from the combustor. In addition, the enhanced heat transfer is provided to the edge of the igniter aperture 120. This enhanced heat transfer occurs due to increased convective surface area provided by the multiple of fins 126.

Figure 7:
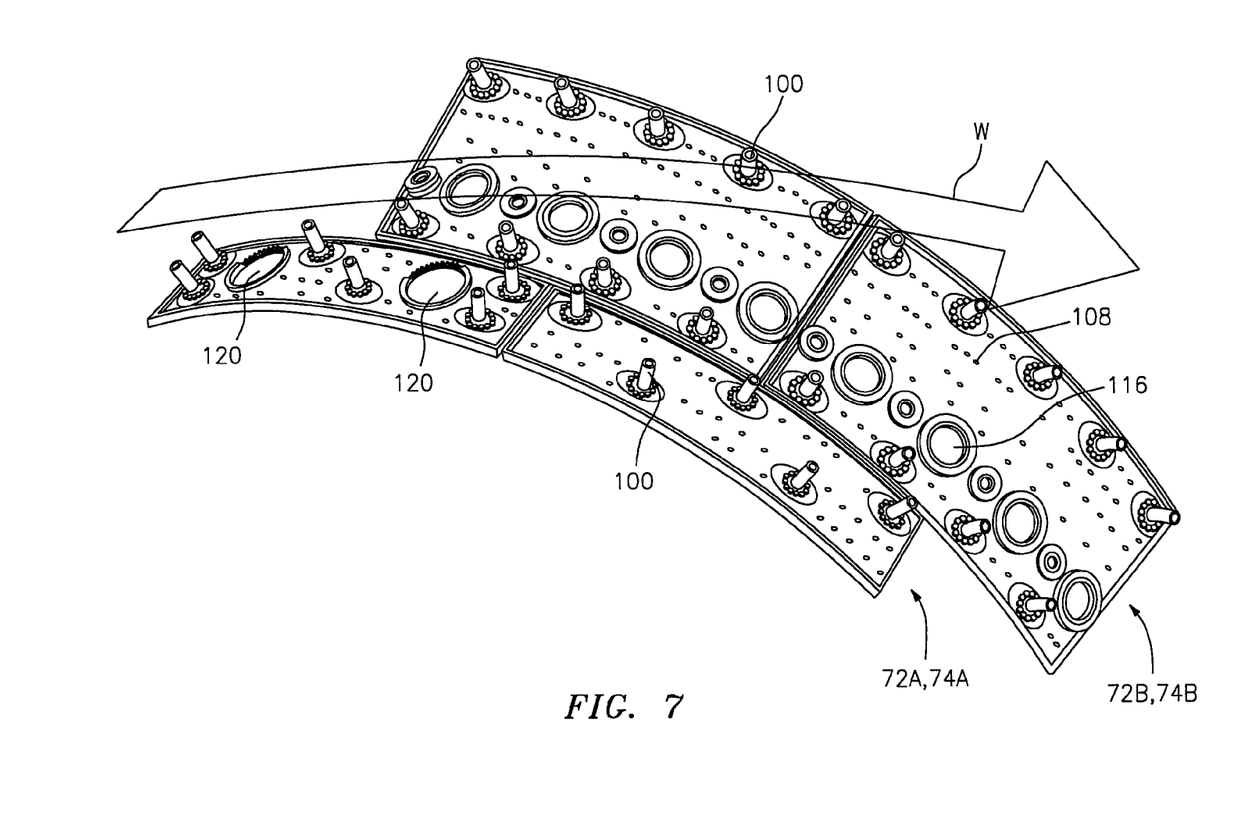
FIG. 7 is an expanded perspective view of a heat shield array from a cold side with a pair of igniter apertures in a single heat shield according to one non-limiting embodiment.

The multiple of fins 126 are located proximate the location where the durability of the heat shields 72, 74 may be challenged. In the disclosed non-limiting embodiment, the multiple of fins 126 are located where the fuel-air mixture swirl (illustrated schematically by arrow W in FIG. 7) approaches an upstream edge of the igniter aperture 120 and generally continues to a downstream edge of the igniter aperture 120. Generally, the multiple of fins 126 extend for a circumferential distance less than approximately 50% of the total circumference around the igniter aperture 120. That is, the multiple of fins 126 provide a flowpath for cooling air and provide an increased surface area to the associated heat shields 72, 74. It should be appreciated that various circumferential extents and orientations may alternatively benefit herefrom.

The multiple of fins 126 also increase oxidation life around the igniter aperture 120 and minimizes hot combustion gas ingestion into and around the igniter 88.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor of a gas turbine engine comprising:
a support shell; and
a heat shield mounted to the support shell, the heat shield comprising:
  a hot side; and
  a cold side opposite said hot side, wherein said cold side defines a grommet that surrounds an igniter aperture in the heat shield, said grommet contacts said support shell to provide a seal therewith, and said grommet includes a multiple of fins and a rail;
wherein the multiple of fins are between the heat shield and the support shell;
wherein the rail extends circumferentially around an axis of the igniter aperture along a first portion of a circular trajectory between opposing circumferential rail ends;
wherein the multiple of fins are arranged circumferentially around the axis along a second portion of the circular trajectory such that the multiple of fins are circumferentially inline with the rail along the circular trajectory;
wherein the multiple of fins are in a gap define between the opposing circumferential rail ends; and
wherein each of the multiple of fins has a circular cross-sectional geometry.

2. The combustor as recited in claim 1, wherein said rail extends only partially around a circumference of said igniter aperture.

3. The combustor as recited in claim 1, wherein said multiple of fins extend only partially around a circumference of said igniter aperture.

4. The combustor as recited in claim 1, wherein said rail extends only partially around a circumference of said igniter aperture and said multiple of fins extend only for a remainder of said circumference of said igniter aperture.

5. The combustor as recited in claim 1, wherein said rail extends substantially 240 degrees around said igniter aperture and said multiple of fins extend substantially 120 degrees around said igniter aperture.

6. The combustor as recited in claim 1, wherein said multiple of fins are pegs.

7. The combustor of claim 1, wherein the multiple of fins partially define an outer periphery of the igniter aperture.

8. The combustor of claim 1, wherein the multiple of fins are formed integral with the heat shield.

9. The combustor of claim 1, wherein a first of the multiple of fins is configured as a pin or a peg.

10. The combustor of claim 1, wherein a first of the multiple of fins is a protrusion that is contiguous with and projects out from the cold side.

11. A combustor of a gas turbine engine comprising:
a support shell; and
a heat shield with a grommet that surrounds an igniter aperture, wherein the heat shield is mounted to the support shell, said grommet includes a rail and a multiple of fins disposed between a cold side of the heat shield and the support shell, and the grommet contacts the support shell to provide a seal therewith;
wherein the rail extends circumferentially about an axis of the igniter aperture along a first portion of an annular trajectory, and the multiple of fins are arranged circumferentially about the axis of the igniter aperture along a second portion of the annular trajectory such that the multiple of fins are circumferentially inline with the rail along the annular trajectory; and
wherein a first of the multiple of fins has a circular cross-sectional geometry.

12. The combustor as recited in claim 11, wherein said rail extends only partially around a circumference of said igniter aperture.

13. The combustor as recited in claim 11, wherein said multiple of fins extend only partially around a circumference of said igniter aperture.

14. The combustor as recited in claim 11, wherein said rail extends only partially around a circumference of said igniter aperture and said multiple of fins extend only for a remainder of said circumference of said igniter aperture.

15. The combustor as recited in claim 11, wherein said rail extends substantially 240 degrees around said igniter aperture and said multiple of fins extend substantially 120 degrees around said igniter aperture.

16. The combustor as recited in claim 11, wherein said multiple of fins are pegs.

17. The combustor as recited in claim 11, further comprising an igniter that extends at least partially through said igniter aperture.

* * * * *

UNITED STATES PATENT AND TRADEMARK OFFICE
CERTIFICATE OF CORRECTION

PATENT NO. : 10,309,314 B2
APPLICATION NO. : 14/770341
DATED : June 4, 2019
INVENTOR(S) : Hoke et al.

Page 1 of 1

It is certified that error appears in the above-identified patent and that said Letters Patent is hereby corrected as shown below:

In the Specification

Column 2, Line 44, please delete "army" and insert --array--

In the Claims

Column 7, Line 52, please delete "define" and insert --defined--

Signed and Sealed this
Tenth Day of September, 2019

Andrei Iancu
*Director of the United States Patent and Trademark Office*